W. C. CARTER.
FLOAT TANK MECHANISM FOR CARBURETERS.
APPLICATION FILED APR. 24, 1911.
1,019,948.
Patented Mar. 12, 1912.
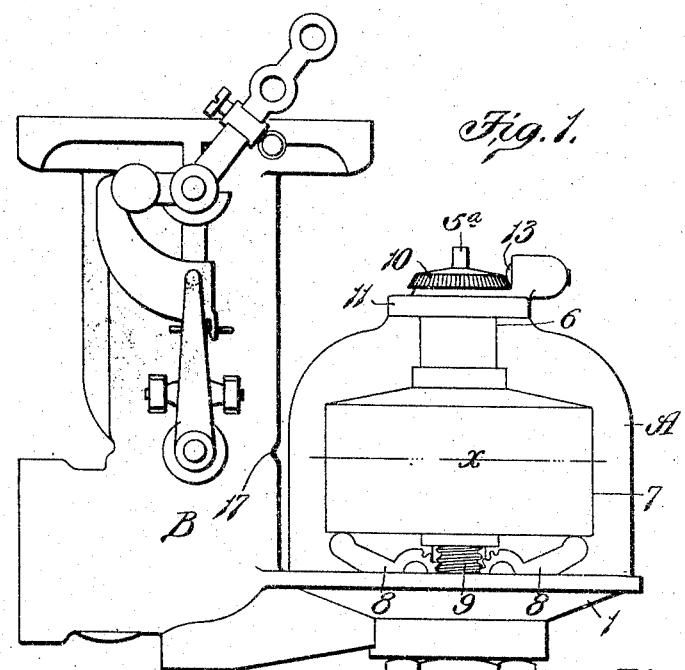
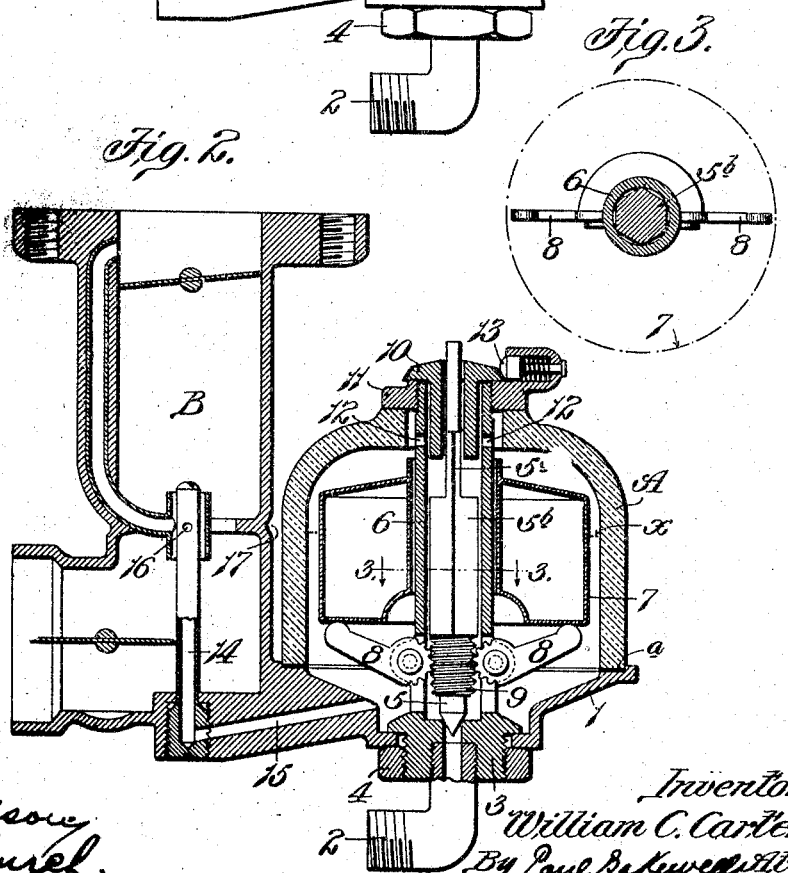

UNITED STATES PATENT OFFICE.

WILLIAM C. CARTER, OF ST. LOUIS, MISSOURI.

FLOAT-TANK MECHANISM FOR CARBURETERS.

1,019,948.  Specification of Letters Patent.  Patented Mar. 12, 1912.

Application filed April 24, 1911. Serial No. 623,017.

*To all whom it may concern:*

Be it known that I, WILLIAM C. CARTER, a citizen of the United States, residing at St. Louis, Missouri, have invented a certain new and useful Improvement in Float-Tank Mechanism for Carbureters, of which the following is a full, clear, and exact description, such as will enable others skilled in the art to which it appertains to make and use the same.

This invention relates to carbureters, and particularly to the mechanism used in the float tank for controlling the valve which regulates the supply of fuel into the float tank.

One object of my invention is to provide a mechanism of the character referred to which is so constructed that the fuel level in the float tank can be varied easily. And another object is to provide a float tank mechanism that comprises a needle valve for controlling the supply of liquid fuel into said float tank, and means of novel construction for varying the position of the float with reference to said valve so as to change the fuel level.

Other objects and desirable features of my invention will be hereinafter pointed out.

Figure 1 is a front elevational view of a carbureter provided with a float tank constructed in accordance with my invention; Fig. 2 is a vertical sectional view of Fig. 1; and Fig. 3 is a horizontal sectional view taken on approximately the line 3—3 of Fig. 2.

Referring to the drawings which illustrate the preferred form of my invention, A designates a substantially dome-shaped shell that forms the top and side walls of the float tank, and 1 designates a member which forms the bottom of the float tank, the shell A being preferably formed from glass so as to enable the mechanism inside of the float tank to be seen easily. It will be obvious, however, that the shell A could be formed from metal or any other suitable material, and therefore I do not wish it to be understood that my invention is limited to a glass float tank or a float tank formed of transparent material. A fuel-supply pipe 2 leads into the bottom of the float tank, and in the preferred form of my invention as herein shown, said supply pipe is connected to a valve seat member 3 arranged inside of the float tank and provided with a reduced screw-threaded portion that projects through an opening in the bottom of the float tank and on which a nut 4 is mounted so as to securely clamp the valve seat member 3 to the bottom of the float tank, as shown in Fig. 2. A vertically disposed needle valve 5, preferably a gravity-operated valve, coöperates with a port in the valve seat member 3 to regulate the flow of fuel into the float tank, and a vertically disposed guide 6 is provided for holding said valve in position and also to hold the hollow float 7 in position, said guide 6 being substantially tubular-shaped and formed integral with the valve seat member 3, as shown in Fig. 2. The means which transfers the movement of the float 7 to the needle valve 5 consists of a pair of levers 8 pivotally connected to the lower end portion of the guide 6 and provided at their inner ends with toothed segments which lie in a cut-out portion in the guide 6 and engage a worm 9 on the needle valve 5. When the fuel in the float tank falls below the normal fuel level, indicated by the dotted line X, the float 7 will move downwardly and thus exert sufficient pressure on the outer ends of the levers 8 to move the needle valve upwardly so as to permit sufficient fuel to flow into the float tank to reëstablish the normal level. The needle valve 5 is provided at its upper end with a reduced non-circular shank 5ᵃ which passes loosely through an opening of corresponding shape in cross section that is formed in a nut or member 10 which is rotatably mounted in the upper end of the guide 6. When the member 10 is turned the needle valve 5 will turn and the worm 9 on said valve will cause the levers 8 to move relatively to the needle valve, thus changing the normal position of the float 7 with reference to the needle valve and consequently changing the fuel level in the float tank. The guide 6 projects upwardly through an opening in the top wall or dome of the member A, and a cap-piece 11, which is screwed onto the upper end portion of the guide 6, closes said opening and also clamps the member A tightly against the member 1 which forms the bottom of the float tank, a packing *a* of any suitable material being arranged between the lower edge of the member A and the supporting member 1 so as to form a tight joint between said parts. Vent holes 12 are formed in the upper end portion of the guide 6, and the opening in the member 10 which receives the reduced extension or shank 5a of the needle valve, is made large enough to permit a sufficient quantity of air to enter the float tank, the intermediate portion 5b of the needle valve being preferably made non-circular shape in cross section so that air can pass down through the guide 6. The shank 5a of the needle valve projects a slight distance above the adjusting member 10 so that the needle valve can be manually-operated whenever it is desired to flood the carbureter, and suitable means is provided for holding the member 10 in adjusted position, the means herein shown consisting of a spring-pressed plunger 13 carried by the cap-piece 11 and coöperating with teeth or serrations in the edge of the adjusting member 10.

A float tank and valve-operating mechanism of the kind herein shown can be used with various kinds of carbureters, and while I have herein shown it as being in combination with a carbureter of the type illustrated and described in my pending application Serial No. 623,016 filed April 24, 1911, I do not wish it to be understood that it is limited to any particular type of carbureter. Nor do I wish it to be understood that my invention is limited to a structure in which a gravity-operated needle valve is employed for controlling the supply of the fuel to the float tank for other types of needle valves could be used if desired without departing from the spirit of my invention. The carbureter herein shown is provided with a vertically disposed fuel tube 14 whose lower end communicates with a fuel duct 15 that leads from the float tank, and said fuel tube is provided adjacent its upper end with a jet 16 through which the liquid fuel escapes laterally so that it will be vaporized by the air traveling through the passageway formed in the hollow member B.

The main advantage of a float tank and valve-operating mechanism of the kind herein shown is that the operator can change the fuel level easily by simply turning the member 10, the part B of the carbureter being preferably provided with a groove 17 or other suitable device for indicating the horizontal position of the fuel jet 16 so as to aid the operator in determining the fuel level in the float tank. And another advantage of such a mechanism when equipped with a gravity-operated needle valve is that no springs are employed for holding the fuel-controlling valve seated.

Having thus described my invention, what I claim as new and desire to secure by Letters Patent is:

1. In a float tank mechanism for carbureters, a needle valve for controlling the supply of fuel to the float tank, a float, a pivotally mounted device for transferring movement from said float to said needle valve, and coöperating teeth on said device and valve which cause said device to shift relatively to the valve when the valve is rotated.

2. In a float tank mechanism for carbureters, a needle valve for controlling the supply of fuel to the float tank, a float, levers mounted on stationary fulcrums for transferring the movements of the float to said needle valve, coöperating means on said levers and needle valve for changing the normal position of said levers relatively to said valve when said valve is turned so as to vary the float level, and a device arranged outside of the float tank for turning the needle.

3. In a float tank mechanism for carbureters, a rotatable needle valve that controls the supply of liquid fuel to the float tank, a float, a pivotally mounted member for transferring the movements of said float to said needle valve, and a worm on said needle valve that coöperates with a toothed segment on said device.

4. In a float tank mechanism for carbureters, a needle valve provided with a worm gear, levers mounted on stationary fulcrums and provided with toothed sectors which coöperate with said worm gear, a float which is adapted to press upon the free ends of said levers, and means for turning said valve so as to change the position of said levers with reference to said valve and thus vary the fuel level.

5. In a float tank mechanism for carbureters, a fuel-controlling valve which can be rotated, a guide through which said valve passes, a pivotally mounted device carried by said guide, a float which bears on one end of said device, and coöperating means on the opposite end of said device and on said valve which causes said device to be shifted relatively to said valve when the valve is turned.

6. In a float tank mechanism for carbureters, a needle valve for controlling the supply of liquid fuel to the float tank, a guide through which said valve passes, a worm gear on said valve, levers carried by said guide and provided with toothed portions which coöperate with the worm gear on said valve, a float which bears upon the outer ends of said levers, an adjusting device rotatably mounted in said guide, and a non-circular shank on said valve which passes through an opening of corresponding shape in said adjusting device.

7. In a float tank mechanism for carbureters, a needle valve for controlling the supply of liquid fuel to the float tank, a worm gear on said valve, a guide through which said valve passes, levers carried by said guide and provided with toothed portions which coöperate with the worm gear on said valve, a float which bears upon the outer ends of said levers, an adjusting device rotatably mounted in said guide, a non-circular shank on said valve which passes through an opening of corresponding shape in said adjusting device, and means for locking said adjusting device in position.

8. In a float tank mechanism for carbureters, a needle valve, a vertically disposed guide in which said valve is arranged, levers pivotally connected to said guide, and provided with toothed sectors which coöperate with a worm on said valve, a float surrounding said guide and coöperating with said levers to raise and lower the valve, an adjusting device rotatably mounted in the upper end of said guide for turning said needle valve so as to change the position of the levers with reference to said valve, and vent ports in said guide.

9. In a float tank mechanism for carbureters, a float tank having a transparent portion which permits the fuel in said tank to be seen, a freely movable needle valve for controlling the supply of fuel to said float tank, a float in said tank, a pivotally mounted device for transferring movement from said float to said needle valve, and means for causing said pivotally mounted device to move relatively to said needle valve so as to change the fuel level when said needle valve is rotated.

10. A float tank for carbureters comprising a member that forms the bottom of the float tank, a substantially dome-shaped shell mounted on said member that forms the side and top walls of the float tank, a guide projecting upwardly from said bottom member and passing through an opening in the top of said shell, a cap-piece screwed onto the upper end of said guide and operating to clamp said shell firmly against said bottom member, a needle valve arranged in said guide, a float arranged on said guide, and levers carried by said guide for transferring movement from said float to said needle valve.

11. A float tank for carbureters comprising a member that forms the bottom of the float tank, a substantially dome-shaped shell mounted on said member that forms the side and top walls of the float tank, a guide projecting upwardly from said bottom member and passing through an opening in the top of said shell, a cap-piece screwed onto the upper end of said guide and operating to clamp said shell firmly against said bottom member, a needle valve arranged in said guide, a float arranged on said guide, levers carried by said guide for transferring movement from said float to said needle valve, toothed sectors on the inner ends of said levers, a worm on said needle valve which coöperates with said toothed sectors, and an adjusting device rotatably mounted in the upper end of said guide for turning said needle valve so as to change the position of the levers relatively to said guide.

12. A float tank for carbureters comprising a member that forms the bottom of the float tank, a valve seat member detachably connected to said bottom member and provided with a port which communicates with a fuel-supply pipe, a tubular-shaped guide projecting upwardly from said valve seat member, a needle valve arranged in said guide for controlling the flow of fuel through said port, a worm on said valve, a dome-shaped shell formed of transparent material that forms the side and top walls of the float tank, said shell having an opening through which the upper end of said guide passes, a cup-piece screwed onto the upper end of said guide for clamping said shell tightly against said bottom member, a float in said tank that surrounds said guide, levers pivotally connected to said guide and provided at their inner ends with toothed sectors which coöperate with the worm on said needle valve, and an adjusting device rotatably mounted in the upper end of said guide for turning said needle valve so as to change the position of said levers and thus vary the fuel level.

13. In a float tank mechanism for carbureters, a needle valve for controlling the supply of fuel to the float tank, said valve being capable of being rotated, a float, a pivotally mounted device operated by the float for actuating said valve, means arranged outside of the float tank for rotating the needle valve, and means for causing said device to move relatively to the valve so as to vary the fuel level whenever said valve is rotated.

14. In a float tank mechanism for carbureters, a needle valve for controlling the supply of fuel to the float tank, a guide in which said valve is arranged, a float, a pivotally mounted device on said guide which is adapted to be actuated by the float, coöperating teeth on said valve and device for transmitting the movements of said device to said needle, and means independent of the float for adjusting said device relatively to said needle valve.

In testimony whereof I hereunto affix my signature in the presence of two witnesses, this twentieth day of April 1911.

WILLIAM C. CARTER.

Witnesses:
W. L. CHURCH,
GEORGE BAKEWELL.